March 8, 1927.　　　　F. W. KENNEDY　　　　1,620,261

ROTARY GEAR PUMP

Filed June 11, 1924

WITNESS:

INVENTOR

Frank W. Kennedy
BY
Busser and Harding
ATTORNEYS.

Patented Mar. 8, 1927.

1,620,261

UNITED STATES PATENT OFFICE.

FRANK W. KENNEDY, OF TRENTON, NEW JERSEY, ASSIGNOR TO DE LAVAL STEAM TURBINE COMPANY, OF TRENTON, NEW JERSEY, A CORPORATION OF NEW JERSEY.

ROTARY GEAR PUMP.

Application filed June 11, 1924. Serial No. 719,237.

This invention relates to a rotary pump of the gear type, and is more especially adapted, but not limited, to a pump having helical teeth with single helix. The object of the invention is to provide means to automatically balance the end thrust and prevent metallic contact between the ends of the gears and the casing.

End thrust in rotary helical gear pumps is produced by the action of the helical gears. Any unequal distribution of pressure on the ends of the gears will also produce end thrust. Theoretically, the pressure on the ends of the gears is the mean between discharge pressure and suction pressure and pressures on opposite ends are equal, but practically the pressures on the two ends may not be exactly equal, and consequently end thrust will result from this cause also. Such end thrust, from whatever cause or causes produced, causes the gears to rub against the casing, producing wear.

In my invention, forces tending to produce end thrust are automatically counteracted and the pressures acting on opposite ends of the gears are maintained equal. Further, a film of liquid is automatically provided between the ends of the gears and the casing. There can, therefore, be no metallic contact between the ends of the gears and the casing.

One embodiment of the invention is shown in the drawings, in which—

The casing $a$ is shaped to accommodate the helical gears $b$, $b'$, their shafts $c$, and shaft bearings $d$. The shaft of one of the gears ($b'$) constitutes the driving shaft of the pump and extends through the casing. That part of the casing enclosing the gears is of somewhat greater internal length than the gears, leaving clearances $e$ between the ends of the gears and the casing. The gears are provided with central end recesses $f$, whose peripheries extend slightly beyond the bearings $d$ to the clearances $e$. There are also slight clearances $g$ between the shafts $c$ and their surrounding bearings.

Communicating with the discharge side of the pump is a pipe $h$ with branches communicating with the spaces at the ends of the shafts communicating with the clearances $g$.

The pressure at the discharge side $x$ of the pump being greater than that at the suction side $y$, there will be a flow of liquid through the pipe $h$, clearances $g$, recesses $f$ and clearances $e$ to the spaces between the gear teeth, which, throughout an arc of each gear, open into the suction side of the pump.

Figure 1:
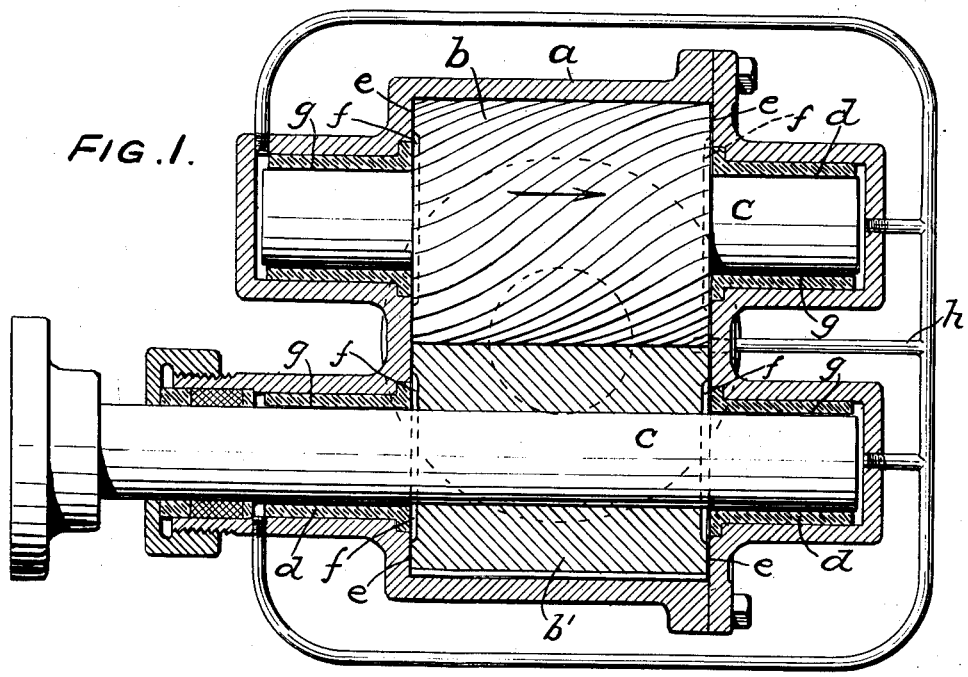
Fig. 1 is a sectional view through the pump.
Figure 2:
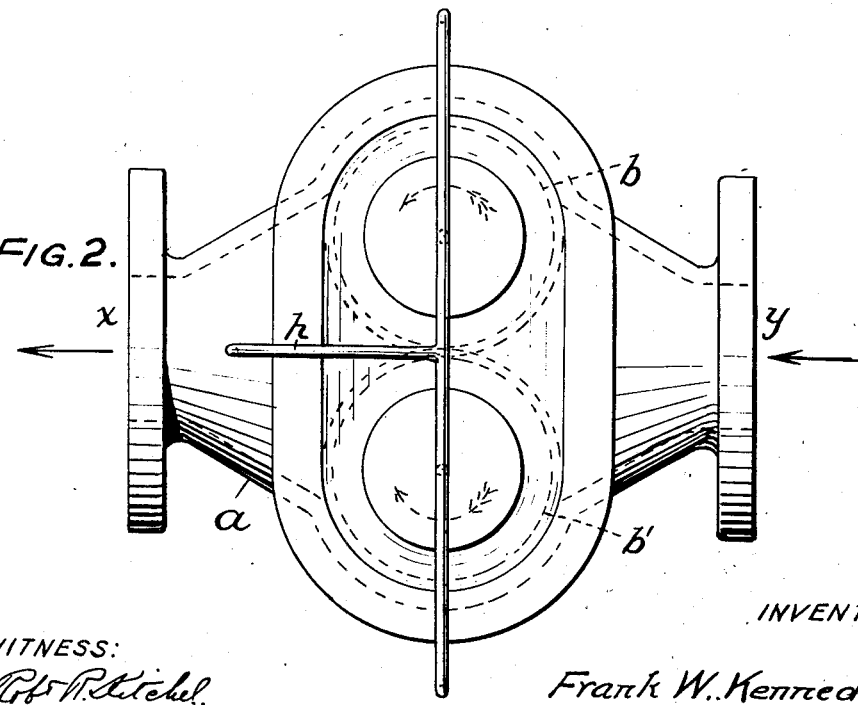
Fig. 2 is a side view of the pump.

Assuming that the gear $b$ has a thrust in the direction of the arrow, Fig. 1, it will, of course, have a tendency to move in that direction, thus tending to close the escape of liquid from the recess $f$ at the right hand end of the gear and at the same time increasing the flow of liquid from the recess $f$ at the left hand end of the gear. This results in an increase of pressure in the recess $f$ at the right hand end of the gear and a decrease of pressure in the recess $f$ at the left hand end of the gear. This builds up an end pressure tending to move the gear from right to left until the forces tending to move the gear from left to right are exactly counterbalanced. In other words, the gear will be perfectly balanced for end thrust.

It should be noted that the oil enters the recesses $f$ through the clearances $g$ between the shaft and the bearing, and that the total clearance area between the shaft and the bearing is made smaller than the clearance area at $e$ between the end of the gear and the casing when the gear is in its extreme position. In other words, if it be assumed that the gear has moved to its extreme right, the pressure in the left hand recess $f$ would be the mean between suction and discharge pressures, due to the fact that the liquid can escape from this recess faster than it can enter; and the pressure in the right hand recess $f$ would be equal to the discharge pressure. The difference in pressures on opposite ends of the gear existing in this assumed position would be substantially greater than that required to counteract the end thrust tending to move the gear to the right, so that in fact the gear never reaches this extreme position, and the maintenance of a film of liquid between both ends of the gear and the casing is insured.

Having now fully described my invention, what I claim and desire to protect by Letters Patent is:

1. A pump having a casing with an inlet and discharge outlet for the fluid to be pumped, intermeshing pump gears in the casing between the inlet and discharge sides of the casing, there being a slight clearance space between the ends of the gears and the walls of the casing, there also being fluid delivery conduits for delivering fluid from the discharge side of the pump to the clearance spaces between the ends of the gears and the casing, whereby a flow of fluid is maintained between the ends of the gears and casing from the discharge side of the pump to counterbalance the end thrust of the gears by the flow of such fluid.

2. A pump having a casing with an inlet and a discharge outlet for the fluid to be pumped, intermeshing pump gears in the casing between the inlet and discharge sides of the casing, there being a slight clearance space between the ends of the gears and the walls of the casing, there also being fluid delivery conduits for delivering fluid from the discharge side of the pump to the clearance spaces between the ends of the gears and the casing, the area of the clearance space between the ends of the gears and the casing at one side of the pump being greater than the area of the inlet for the fluid thereto, when the end thrust on the gears has shifted said gears from their central position and reduced the clearance space between the gears and the casing to a predetermined area at the end of the pump toward which they have been shifted, whereby the fluid pressure at one side of the pump is reduced while the fluid pressure at the other side is maintained to counterbalance said end thrust of the gears.

3. A pump having a casing with an inlet and a discharge outlet for the fluid to be pumped, intermeshing pump gears in the casing between the outlet and discharge side of the casing, a shaft on each end of each gear extending into bearings closed at their outer ends, fluid conduits connecting each bearing with the discharge side of the pump, there being a fluid chamber between each end of each gear and the casing surrounding the shaft, a narrow clearance space between each end of each gear and the casing communicating with said last mentioned chambers and the space in the casing surrounding the gears, there also being a small clearance space between the shafts and the bearings, to permit the flow of fluid from the discharge side of the pump, through the bearings, chambers and clearance spaces between the gears and walls of the casing back to the space in the casing surrounding the gears, the area of the clearance spaces between the gears and the casing being greater at one end of the gears than the area of the spaces between the shafts and bearings at said ends, when the gears are shifted toward the other side of the casing, whereby the fluid pressure between said gears and the casing at said first mentioned ends of the gears is below the fluid pressure at the other ends of the gears to counterbalance the end thrust on the gears.

In testimony of which invention, I have hereunto set my hand, at Trenton, on this 7th day of May, 1924.

FRANK W. KENNEDY.